(12) United States Patent
Jacob et al.

(10) Patent No.: US 7,294,313 B2
(45) Date of Patent: Nov. 13, 2007

(54) DEVICE AND METHOD FOR PRODUCING AMMONIA FROM SOLID UREA PELLETS

(75) Inventors: Eberhard Jacob, Landsberg/Lech (DE); Erwin Stiermann, Neusäss (DE)

(73) Assignee: Man Nutzfahrzeuge AG (DE)

( * ) Notice: Subject to any disclaimer, the term of this patent is extended or adjusted under 35 U.S.C. 154(b) by 170 days.

(21) Appl. No.: 11/218,255

(22) Filed: Sep. 1, 2005

(65) Prior Publication Data

US 2006/0045835 A1    Mar. 2, 2006

(30) Foreign Application Priority Data

Sep. 1, 2004   (DE)   ............ 10 2004 042 225

(51) Int. Cl.
*B01J 8/02*      (2006.01)
*B01J 7/00*      (2006.01)
*C01C 1/08*      (2006.01)
*F01N 3/08*      (2006.01)
*B01D 53/34*     (2006.01)

(52) U.S. Cl. ............ 422/148; 422/168; 422/211; 422/232; 422/198; 423/352; 423/355; 423/212; 60/274; 60/282

(58) Field of Classification Search ............ None
See application file for complete search history.

(56) References Cited

U.S. PATENT DOCUMENTS

| 5,584,265 | A | * | 12/1996 | Rao et al. ............ 123/1 A |
| 6,601,385 | B2 | * | 8/2003 | Verdegan et al. ............ 60/286 |
| 6,928,807 | B2 | * | 8/2005 | Jacob et al. ............ 60/286 |
| 7,178,329 | B2 | * | 2/2007 | Bertiller et al. ............ 60/286 |

* cited by examiner

*Primary Examiner*—Glenn Caldarola
*Assistant Examiner*—Jennifer A. Leung
(74) *Attorney, Agent, or Firm*—Robert W. Becker; Robert W. Becker & Associates

(57) ABSTRACT

A device for producing ammonia from urea pellets includes a pellet dispensing device, a pellet accelerator, a pellet shooting channel, and an ammonia reactor having a chamber or zone for shooting in urea pellets and a pellet deflector arranged on an end of the shooting path. The device further includes a urea pellet evaporation device and a hydrolytic catalytic converter. The urea pellets are removed from the reservoir in a regulated number/quantity by a dispensing device and transported to the accelerating device, where the pellets are moved from the pellet shooting channel into the ammonia reactor, where they are broken down into small pieces by impacting a pellet deflector at the end of the shooting path. The pieces are converted into a gas mixture containing ammonia and isocyanic acid by means of a urea evaporation device. The isocyanic acid is subsequently converted into ammonia and carbon dioxide.

18 Claims, 4 Drawing Sheets

DEVICE AND METHOD FOR PRODUCING AMMONIA FROM SOLID UREA PELLETS

BACKGROUND OF THE INVENTION

The present invention relates to a device and method for producing ammonia from solid urea pellets which are stored in a reservoir.

The invention originates from EP 1 338 562 A1. In this document, a method and device for ammonia production is described. Solid urea, which is stored in the form of prills or pellets or particles in a reservoir, with the assistance of a pressure flow is supplied to a reactor for ammonia production. In this, the supplied solid urea is converted by flash thermolysis into a gas mixture of ammonia and isocyanic acid. This gas mixture is immediately thereafter post-treated in the presence of water vapor catalytically, during which hydrolysis the isocyanic acid likewise is converted into ammonia and carbon dioxide. The compressed air-supported dispensing of the solid urea particles requires a permanently available compressed air source, which is replenished by means of a compressor. This can be expensive.

SUMMARY OF THE INVENTION

It is an object of the present invention to provide a device and method for producing ammonia from solid urea particles which does not require compressed air-supported dispensing of the urea pellets.

The device of the present invention has a plurality of separate devices, which cooperate with one another to produce ammonia from the stored, solid urea pellets.

With these separate devices, the device operates as a pellet dispensing device, a pellet accelerator, a pellet shooting channel, and an ammonia reactor having a chamber or a zone for shooting in urea pellets, a pellet deflector arranged on an end of the shooting path, a urea evaporation device, and a hydrolytic catalytic converter. According to the method of the present invention, the urea pellets are removed by means of the dispensing device from the reservoir in measured amounts or numbers and transported to the pellet accelerator, by means of which they are accelerated internally and mechanically to a high speed of 100 m/sec for example and exit via the pellet shooting channel into the ammonia reactor where they are broken-down into a plurality of pieces at the end of the shooting path on a pellet deflector disposed there. These pellet pieces are immediately thereafter converted into a gas mixture of ammonia ($NH_3$) and isocyanic acid (HNCO) by means of the urea evaporation device by thermal hydrolysis, in particular flash hydrolysis. The harmful isocyanic acid (HNC) is eliminated in that this gas mixture is immediately post-treated catalytically in the presence of water vapor and is conducted through a hydrolytic catalytic converter, in which the isocyanic acid is converted into ammonia and carbon dioxide. At the end of the method, the gas mixture containing ammonia produced by the hydrolytic catalytic converter is conducted to an apparatus, piece of equipment, or device associated with the ammonia reactor, such as an SCR catalytic converter, according to its further use. The shooting in of the urea pellets into the ammonia reactor has the advantage that a stoppage or adherence to the shooting channel by urea is avoidable. The impingement of the shot-in urea pellets onto the pellet deflector has the advantage that the small pieces are traversable quickly and with comparable minimal heat energy expenditure into a gaseous aggregate state.

BRIEF DESCRIPTION OF THE DRAWINGS

Next, the device of the present invention will be explained in greater detail with reference to the accompanying figures, in which:

FIG. 1 with FIG. 1B shows schematically the device of the present invention with an ammonia reactor disposed within an exhaust bypass line;

FIG. 1 with FIG. 1C shows schematically the device of the present invention with an ammonia reactor disposed within an exhaust line;

FIG. 1 with FIG. 1D shows schematically the device of the present invention with an ammonia reactor disposed within an exhaust line;

DETAILED DESCRIPTION OF THE SPECIFIC EMBODIMENTS

Figure 1:
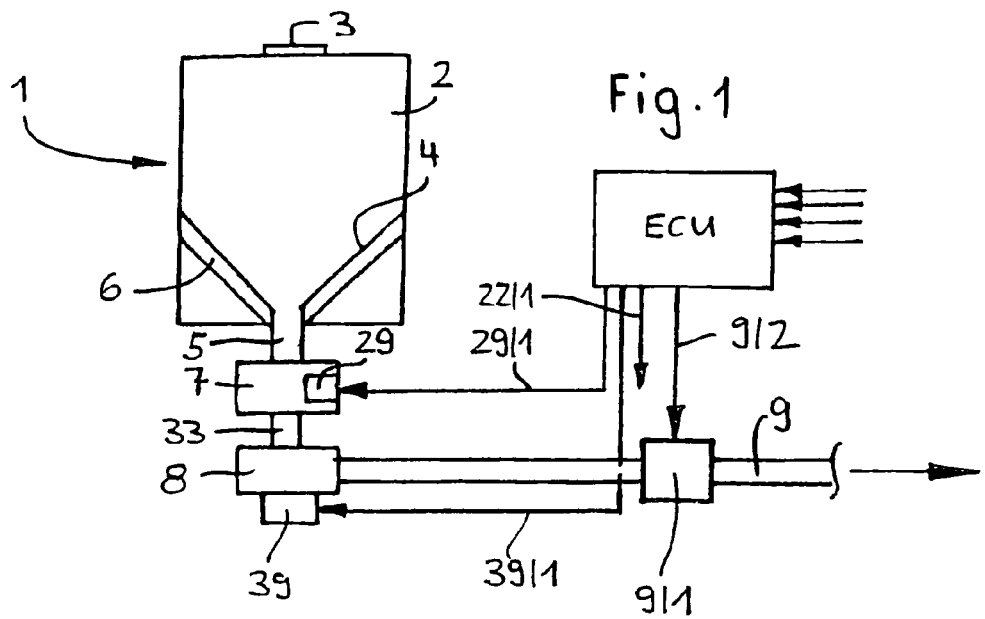
FIG. 1 with FIG. 1A shows schematically the device of the present invention with an ammonia reactor disposed outside of an exhaust line.

In the figures, a reservoir for solid urea pellets is designated with reference numeral 1. The urea pellets preferably are spherical urea granulate, whereby the urea pellets are all the same size and in the shape of spheres with a diameter of a few tenths of a millimeter up to multiple millimeters. The urea pellets can be stored internally in the reservoir 1 in a storage chamber 2 as bulk material and can be refilled via a closeable filling opening 3. The storage chamber 2 tapers in a funnel-like manner at 4 to an outlet 5. A device that is not shown in detail is designated with reference numeral 6, which serves to hold the urea pellets stored in the chamber 2 in a dry and free-flowing state, that is, to prevent their adhesion. At the outlet 5, a pellet dispensing device 7 is connected and to this, in turn, a pellet accelerator 8 is connected. At its outlet, a pellet shooting channel 9 is connected, which opens into a chamber or zone 10 in a reactor for ammonia production. The latter is designated subsequently as an ammonia reactor 11. This has the chamber or zone 10 for shooting in of urea pellets and a pellet deflector 12 disposed at the end of the free shooting path. In addition, the ammonia reactor 11 has a urea evaporation device 13 and a hydrolytic catalytic converter 14 connected thereto. In the pellet shooting channel 9—preferably near its reactor-side end/outlet—a shutoff device 9/1, for example a slide valve, is formed, which is controlled by instruction (see arrow 9/2) of an electronic control and regulating electronic device ECU and is switched into the open or pass-through position only when a requirement for urea pellets occurs, that is when the pellet dispensing device 7 and the pellet accelerator 8 are operating. As soon as the latter is switched off, the shutoff device 9/1 is switched into the shutoff position only so that then no hot gases can permeate into the closed-off part of the shooting channel 9. The individual embodiments or examples of application of an exhaust gas line are designated with reference numeral 15, which conducts away the exhaust of an internal combustion engine or gas turbine or a burner, and which exhaust can be post-treated with assistance of the ammonia produced by the present invention.

Figure 1A:
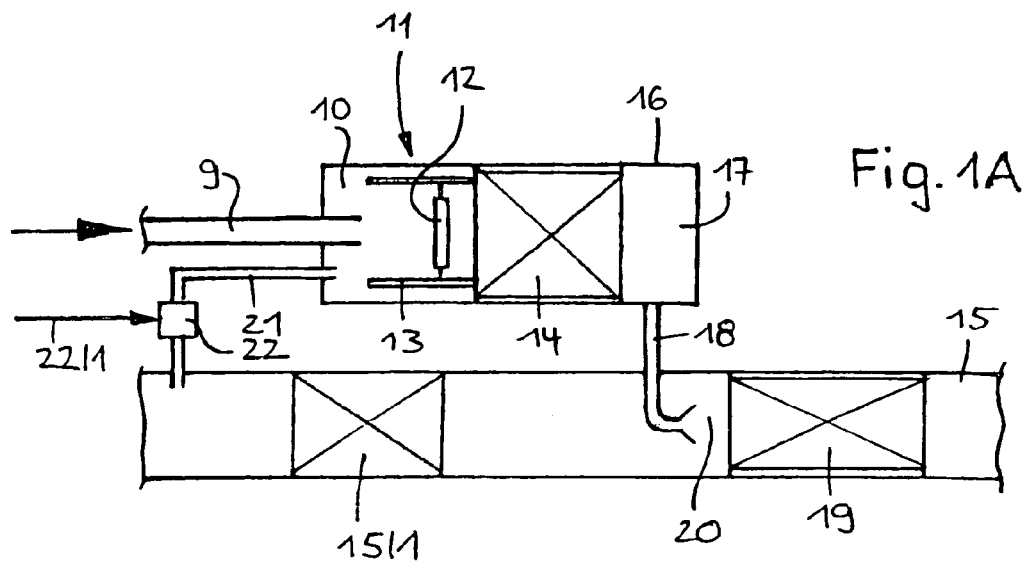

FIG. 1 shows in connection with FIG. 1A a version of the device of the present invention in which the ammonia reactor 11 is disposed outside of the exhaust line 15. In this version, the ammonia reactor 11 has an outer housing 16, in which the urea evaporation device 13, for example in the form of a cylindrical heating tube, is disposed within the chamber or zone 10. In a rear region, the pellet deflector 12 is arranged, such that the produced gas mixture can flow outward to the hydrolytic catalytic converter connected to it. This extends over the total cross section of the outer housing 16. Downstream from the hydrolytic catalytic converter 14, an outlet chamber 17 is provided, from which the produced gas mixture can be supplied via a supply line 18 to a subordinate device. In the case of FIG. 1A, the supply line 18 leads into the exhaust line 15 and opens there, spaced ahead of at least one SCR catalytic converter 19 formed in this or in a muffler, into a mixture zone 20, in which the supplied gas mixture can be mixed with the exhaust before introduction into the SCR catalytic converter 19. With the method of the present invention, water or water vapor is required in order to enable a corresponding chemical post-treatment of the harmful isocyanic acid formed during the thermolysis of the urea particles. This water can either be directly dispensed, however, alternatively and preferably, the residual water vapor of the exhaust is used as the water supply, whereby in the case of FIG. 1 and FIG. 1A, an exhaust partial flow from the exhaust line 15 is supplied via a supply line 21 branching off from the exhaust line 15 into the chamber or the zone 10 of the ammonia reactor 11. It is supplied in optimally regulated quantities via control valve 22 adjusted accordingly via a control and regulating electronic device ECU through the control line 22/1. Between the branching-off position of the supply line 21 and the outlet point of the supply line 18, a flow resistance 15/1 is disposed in the gas line 15, which can be a turbine of an exhaust turbocharger and/or a pre-oxidation catalytic converter for $NO_2$ production.

Figure 1B:
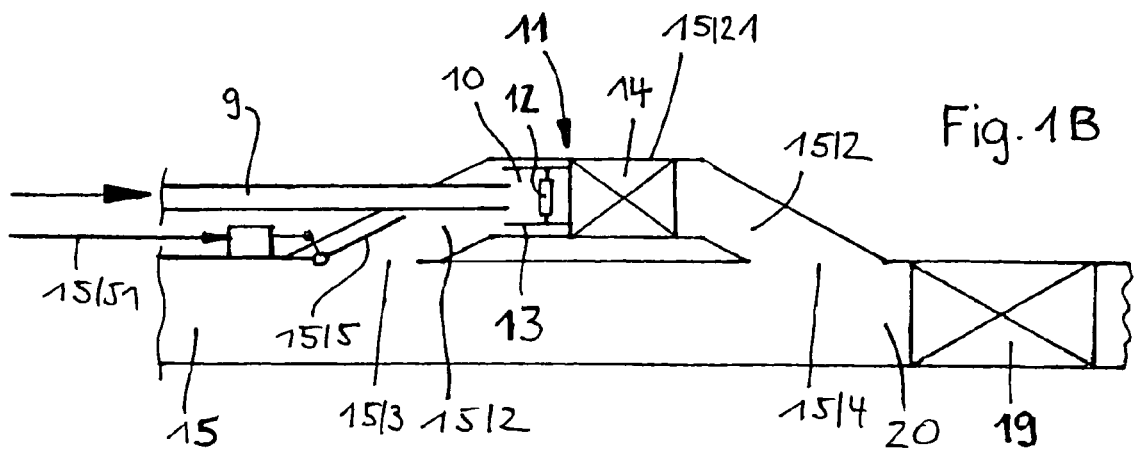

Alternatively, FIG. 1 shows in connection with FIG. 1B a version of the device of the present invention in which the ammonia reactor 11 is integrated in an exhaust bypass line 15/2. This branches off from the exhaust line 15 at a branching position 15/3 and downstream of the ammonia reactor 11 again opens into the exhaust line 15, whereby the outlet position 15/4 is disposed closely ahead of the SCR catalytic converter 19 and the mixing zone 20 provided in front of this. In this case, the ammonia reactor 11 is provided in a section 15/21 of the exhaust bypass line 15/2 forming the housing for this, in which the hydrolytic catalytic converter 14 is integrated over the entire line cross section; the urea evaporation device 13 as well as the zone 10 are arranged in front of the hydrolytic catalytic converter. The pellet shooting channel 9 opens into the zone 10 and the pellet deflector 12 is arranged on the free end of the shooting path. Also here the urea evaporation device 13 in the form of a cylindrical heating tube or a cylindrical heating spiral is realized and in its back region, the pellet deflector 12 is held, such that the produced gas mixture can flow outward to the hydrolytic catalytic converter 14. In this case, the exhaust bypass line 15/2 supplies an exhaust partial flow into the ammonia reactor 11, similar to the supply line 21 of FIG. 1A. The exhaust partial flow also here is relied on with its residual water vapor portion as the water supply in order to chemically convert the harmful isocyanic acid along with the ammonia existing during the evaporation of the urea in the hydrolytic catalytic converter 14 into ammonia and carbon dioxide. The amount of the exhaust partial flow is adjustable via a closing/opening control device 15/4 arranged in the area of the inlet 15/3 of the exhaust bypass line 15/2, which can assume a shutoff position, a completely open position, and various intermediate positions between these positions and which is actuatable by a control device, which obtains its instructions via a control line 15/51 from the regulating and control unit ECU.

Figure 1C:
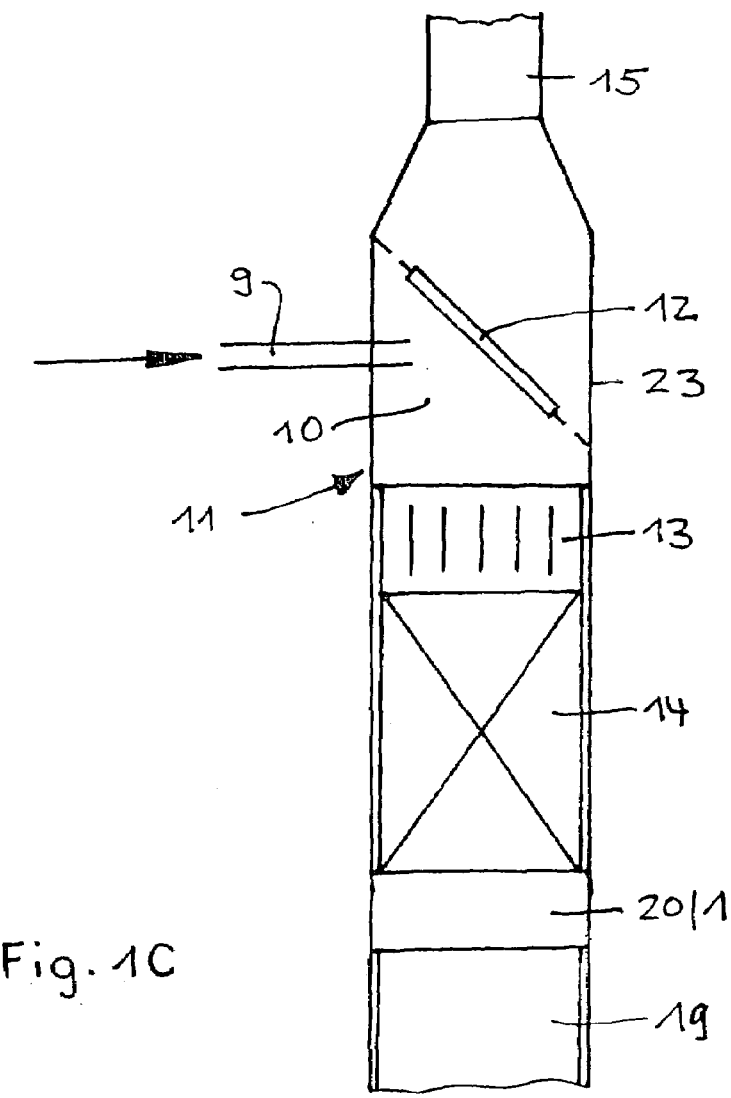
Figure 1D:
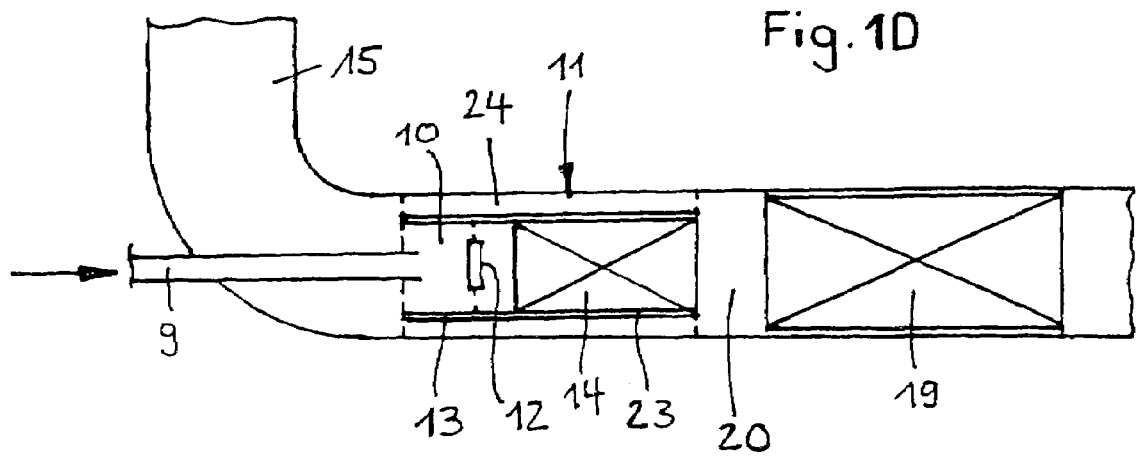

Alternatively, FIG. 1 in connection with FIG. 1C and FIG. 1D shows a version of the device of the present invention in which the ammonia reactor 11 is disposed within the exhaust line 15 upstream from the SCR catalytic converter(s) 19. In the case of FIG. 1 with FIG. 1C, the ammonia reactor 11 has a housing 23, which forms a part or section of the gas line 15. In the case of FIG. 1 with FIG. 1D, the housing 23 of the ammonia reactor has a smaller diameter than the exhaust line 15 and is arranged coaxially in the exhaust line, so that outside of the housing 23, an annular space 24 remains through which flow can pass. In the housing 23, the hydrolytic catalytic converter 14 and the urea evaporation device 13 disposed spatially ahead of the hydrolytic catalytic converter 14 are accommodated. The pellet shooting channel 9 openings into the zone 10 and on the end of the free shooting path, the pellet deflector 12 is arranged. In the case of FIG. 1 with FIG. 1C, the hydrolytic catalytic converter 14 extends over the entire cross section of the housing 23 and the deflector 12 is disposed at an angle in the housing 23 spatially ahead of the urea evaporation device 13, so that the debris portions of the impinged urea pellets are deflected to the urea evaporation device 13.

The deflector 12 is formed in all cases as a solid smooth or corrugated or otherwise structured metal plate suitable for pellet impingement.

After the ammonia reactor 11, a deflection/slow-down zone 20/1 is provided in the exhaust line 15 and spatially before the SCR catalytic converter(s) 19, in the case of FIG. 1 with FIG. 1C, and in the case of FIG. 1 with FIG. 1D, also a mixture zone 20 is provided, in which the gas mixture exiting from the hydrolytic catalytic converter 14 can be mixed before its introduction in the SCR catalytic converter(s) with the exhaust gas supplied via the annular space 24. In the case of FIG. 1 with FIG. 1C, the hydrolytic catalytic converter 14 is completely passed through by the exhaust coming from the exhaust line 15 and so its residual water vapor is used completely. In the case of FIG. 1 with FIG. 1D, in contrast, the hydrolytic catalytic converter 14 is only passed through by an exhaust partial flow and its residual water vapor is used to convert the isocyanic acid existing during the urea evaporation into ammonia and carbon dioxide.

Figure 2:
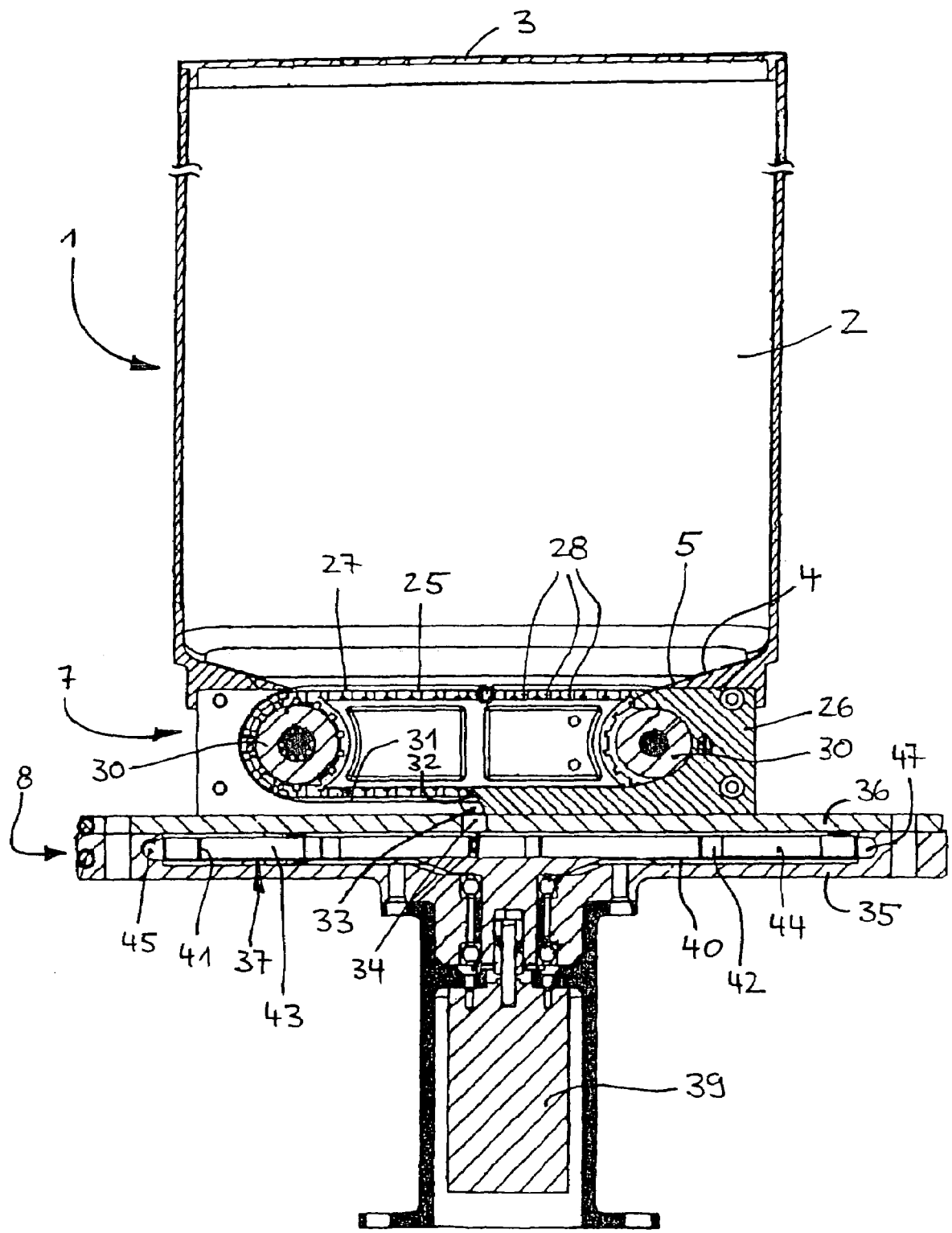
FIG. 2 shows an embodiment of a pellet reservoir, a pellet dispensing device, and a pellet accelerator as parts of the device of the present invention.
Figure 3:
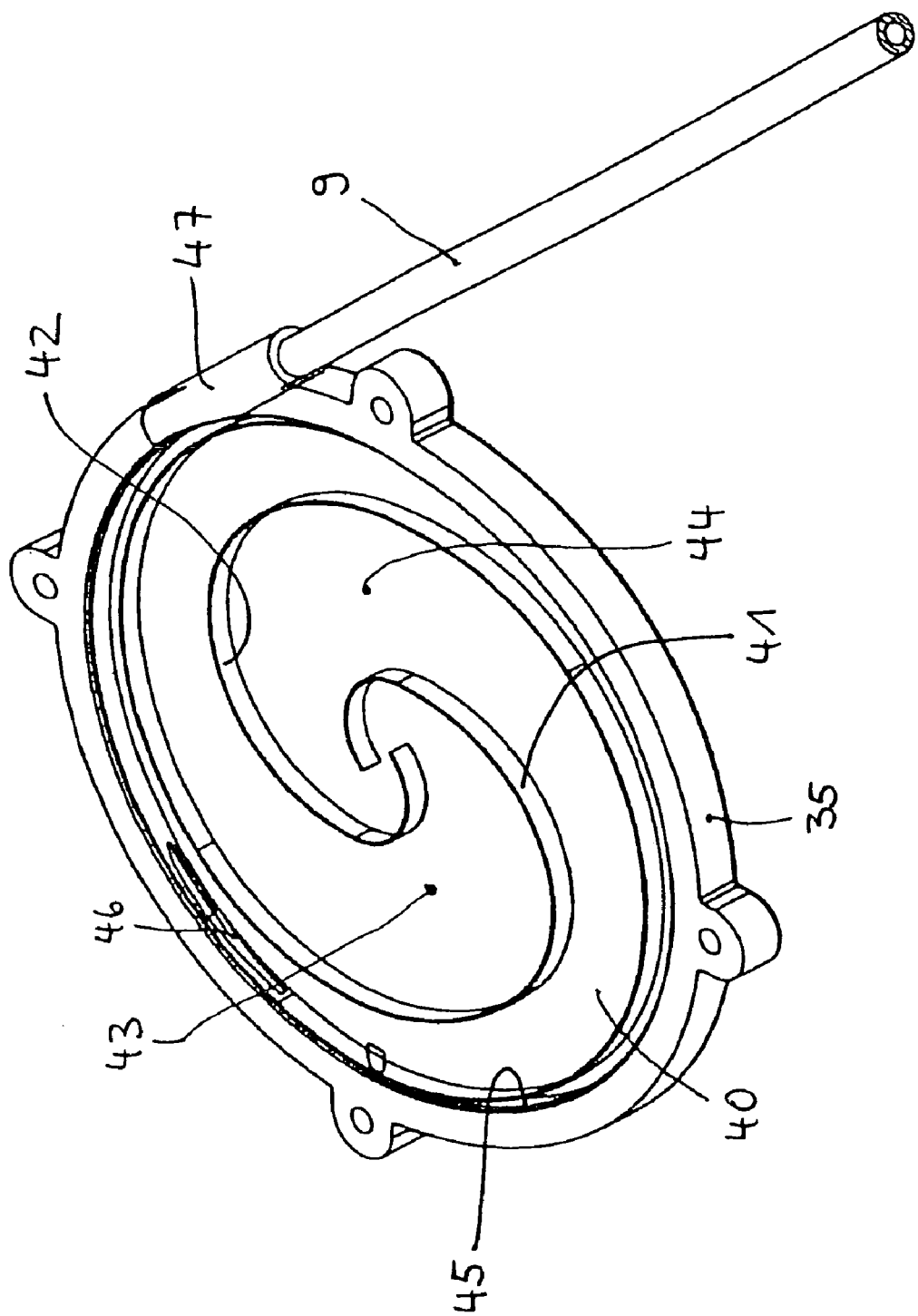
FIG. 3 shows in perspective view the pellet accelerator of FIG. 2 without a housing cover.

Next, different embodiments of the individual components of the device will be explained in greater detail with reference to FIGS. 2 and 3.

The reservoir 1 is constructed and disposed such that the urea pellets stored in its chamber 2 can be conducted out of it by the force of gravity. In this regard, an outlet 5 is disposed at the lowest point of the reservoir 1, which is formed either as an outlet tube that is dimensioned in its diameter to accommodate the individual release of each urea pellet or is formed as an outlet funnel or chute that accommodates the simultaneous release of multiple urea pellets. The latter embodiment is shown in FIG. 2. The outlet chute has a width adapted to the diameter of the urea pellets and a length adapted to the number × diameter of simultaneously released urea pellets.

The pellet dispensing device 7 is connected via its pellet inlet 25 directly to the pellet outlet 5 of the pellet reservoir 1 in a form-fitting manner. In the example shown, the pellet dispensing device 7 has a continuous conveyor belt 27 in a housing connected with the reservoir 1, the conveyor belt having successive depressions 28 for receiving a respective urea pellet. This conveyor belt 27 is drivable by means of an electric motor 29 that is speed-regulated electronically by the regulating and control unit ECU via the control line 29/1 by means of drive gears 30. With this conveyor belt 27, the urea pellets supplied via the inlet 25 can be transported along a guide arm 31 to a redirecting device 32 and then by means of the latter, can be supplied into an outlet channel 33 as well as conducted via this individually from the dispensing device 7.

In the example shown, the pellet accelerator 8 is connected to the outlet channel 33 of the pellet dispensing device 7 via an inlet channel 34 designed for an individual introduction of the supplied urea pellets. The shown pellet accelerator 8 has a housing 35 with a cover 36 in which the inlet channel 34 is formed, and has internally an electromechanical pellet accelerating device 37, by means of which each supplied urea pellet can be accelerated to a speed in the range of up to 100 m/s and then can be shot via an outlet 38 from the housing 35, 36 into the external shooting channel 9 and also conducted further by this into the ammonia reactor 11.

In the example shown, the accelerating device 37 of the pellet accelerator 8 comprises a round disk 40 supported centrally in the housing 35, 36, which is drivable by an electronic, speed-controllable electric motor 39. On the upper side, the disk 40 has at least one acceleration channel 43, 44 defined by walls 41, 42 leading in a spiral-shape from the center to the outer edge. The inlet channel 34 formed in the housing cover 36 opens over its approximately central inner area. The walls defining the accelerating channels 43, 44 have a spiral shape, which is represented as multiple, different arcs and/or a logarithmic curve and/or a curve with a continuous positive incline. In the housing 35, 36 of the pellet accelerator 7, a partial circumferential groove-like outlet channel 45 is provided about the rotating disk 40 at the height of the upper side acceleration channels 43, 44, on whose end 46, a tangentially outgoing tube-shaped outlet channel 47 is connected and to that, the shooting channel 9 is connected. With each spiral-shaped acceleration channel 43, 44, a supplied urea pellet is accelerated by the rotation of the disk 40 with its movement from the center to the end from zero to a maximum and with the high speed produced in this manner, is shot via the outlet channels 46, 47 into the shooting channel 9 as well as into the ammonia reactor 11. Based on their kinetic energy, the individual urea pellets impinged onto the pellet deflector 12 are smashed into a plurality of particulars or pieces. In order to enhance this breaking-down or smashing into as many very small particles as possible, the pellet deflector 27 is structured or formed accordingly on its surface.

The speed of the conveyor belt 27 of the pellet dispensing device 7 and the rotating disk 40 of the pellet accelerator 8 are coordinated exactly to one another in the sense of an optimal quantity/number of urea pellets shot into the ammonia reactor 11, whereby the requirements in this regard are oriented to the acceptance quantity and speed of the gas containing the produced ammonia. This requirement is the variable which is supplied into the computer-supported regulating and control unit ECU, which then converts this nominal value into a corresponding speed regulation of the electric motor 29, 39 driving the conveyor belt 27 and the disk 40. The electric motor 39 driving the disk 40 therefore preferably is regulated and operated at a constant high speed of 15,000-20,000 rpm, for example.

The method of the present invention for producing ammonia from solid urea particles is carried out with the device of the present invention as follows.

The urea pellets are removed from the reservoir 1 by means of the dispensing device 7 in controlled quanties/numbers and transported to the pellet accelerator 8. With this accelerator, each supplied urea pellet is accelerated internally and mechanically to a high speed, then subsequently shot with this speed into an outlet-side shooting channel 9 and via this, further guided into the ammonia reactor 11, where it is broken down into a plurality of pieces at the end of the shooting path at a pellet deflector 12 located there. These pellet pieces are converted directly by means of the urea evaporation device 13 into a gas mixture containing ammonia ($NH_3$) and isocyanic acid (HNCO) at temperatures up to approximately 550° C. This gas mixture is conducted subsequently, together with water vapor, resulting for example from the residual water vapor in the exhaust of an internal combustion engine, gas turbine, or a burner, through a hydrolytic catalytic converter 14, whereby the isocyanic acid is converted into ammonia and carbon dioxide.

At the end of the method of the present invention, a gas mixture containing ammonia is produced by the hydrolytic catalytic converter 14 and can be supplied to a further apparatus or device, for example SCR catalytic converter(s) 19 associated with the ammonia reactor 11, as shown, depending on its further determined use.

The specification incorporates by reference the disclosure of German priority document German patent application 10 2004 042 225.7 filed Sep. 1, 2004.

The present invention is, of course, in no way restricted to the specific disclosure of the specification and drawings, but also encompasses any modifications within the scope of the appended claims.

The invention claimed is:

1. A device for producing ammonia from solid urea pellets stored in a reservoir, comprising:
   a pellet dispensing device;
   a pellet accelerator;
   a pellet shooting channel;
   an ammonia reactor having a chamber or a zone for enclosing urea pellets, a pellet deflector disposed on an end of a free shooting path, a urea evaporation device, and a hydrolytic catalytic converter, wherein the urea pellets are removable from the reservoir in a regulated amount by means of the pellet dispensing device and are transported to the pellet accelerator, wherein the pellets are accelerated to a high speed mechanically and internally via the pellet accelerator, wherein the pellets are shot into the ammonia reactor from the pellet accelerator via the pellet shooting channel, wherein on the end of the shooting path, the pellets are broken down into a plurality of pellet pieces by the deflector and are immediately thereafter convertible into a gas mixture containing ammonia and isocyanic acid by means of the urea evaporation device, and wherein together with water vapor, the gas mixture is conducted through the hydrolytic catalytic converter, whereby the isocyanic acid is converted into ammonia and carbon dioxide.

2. The device of claim 1, wherein the ammonia reactor is disposed within or outside of an exhaust line of an internal combustion engine or gas turbine or a burner.

3. The device of claim 2, wherein the ammonia reactor, when disposed outside of the exhaust line, can be supplied with an exhaust gas partial flow via a supply line running between the exhaust line and ammonia reactor and opening into the space or zone, the supply line having a control valve, wherein the exhaust partial flow branches off from the exhaust line in a controlled amount, wherein a residual water vapor portion of the exhaust partial flow in the ammonia reactor upon flowing through the hydrolytic catalytic converter serves to convert the isocyanic acid resulting during the thermolysis of the urea particles into ammonia and carbon dioxide, and wherein the control valve is adjusted accordingly by means of commands from an electronic regulating and control unit.

4. The device of claim 2, wherein the ammonia reactor, when disposed outside of the exhaust line, is arranged within an exhaust bypass line, via which it can be supplied in a regulated amount with an exhaust partial flow, wherein a residual water vapor portion of the exhaust partial flow in the ammonia reactor upon flowing through the hydrolytic catalytic converter serves to convert isocyanic acid resulting during the thermolysis of the urea particles into ammonia and carbon dioxide, whereby for adjustment of the amount of the exhaust partial flow, an adjustable locking and opening device is provided at an inlet of the exhaust bypass line, wherein the locking and opening device is adjustable by an electronic regulating and control device.

5. The device of claim 2, wherein the ammonia reactor, when disposed within the exhaust line, contains at least the hydrolytic catalytic converter in a substantially coaxial housing and preferably also the urea evaporation device disposed upstream of the hydrolytic catalytic converter, wherein said housing is outwardly passed through by an exhaust partial flow in the exhaust line and by a residual exhaust partial flow flowing internally, wherein a residual water vapor portion of the exhaust partial flow serves to convert isocyanic acid resulting during thermolysis of the urea particles into ammonia and carbon dioxide.

6. The device of claim 2, wherein the ammonia reactor, when disposed inside the exhaust line, is arranged in a housing formed by a part or a section of the exhaust line, whereby the hydrolytic catalytic converter extends over the total cross section of the housing and is flowed-through by a total exhaust flow, wherein a residual water vapor portion of the exhaust flow is completely removable and converts the isocyanic acid resulting during thermolysis into ammonia and carbon dioxide.

7. The device of claim 1, wherein the urea pellets are conducted from the reservoir by force of gravity, wherein an outlet of the reservoir has on a lowermost position either an outlet tube that is adjusted in diameter to an individual release of the urea pellets or an outlet chute adjusted to the simultaneous release of multiple urea pellets, said chute having a width adjusted to the diameter of the urea pellets and a length adapted to the number xdiameter of simultaneously released urea pellets.

8. The device of claim 1, wherein the pellet dispensing device is connected to a lower part of the pellet outlet of the reservoir via a pellet inlet in a form-fitting manner.

9. The device of claim 1, wherein the pellet dispensing device in a housing has a continuous conveyor belt running past the pellet inlet, wherein said conveyor belt is drivable via an electric motor that is electronically speed-regulated by a regulating or control unit and by means of which the urea pellets fed via the pellet inlet can be transported along a guide arm to a redirecting device that is disposed at an end of the guide arm and by means of which the pellets can be conducted individually and successively into an outlet channel, via which the pellets can be released individually from the dispensing device.

10. The device of claim 1, wherein the pellet accelerator is connected via an inlet channel to an outlet channel of the pellet dispensing device, and wherein the inlet channel is designed for an individual introduction of the supplied urea pellets.

11. The device of claim 1, wherein the pellet accelerator has a housing with an inlet channel for individual introduction of the dispensed urea pellets and has internally an electromechanical pellet accelerating device, by means of which each supplied urea pellet is accelerated to a speed of up to 100 m/s, with which the pellet then can be shot via an outlet from the housing of the pellet accelerator and into the external shooting channel and conducted via the shooting channel into the ammonia reactor.

12. The device of claim 11, wherein the pellet accelerating device comprises a round disk placed centrally in the housing, wherein the pellet accelerating device is drivable by an electric motor that is speed-regulated electronically by a regulating and control unit, wherein the pellet accelerating device has on an upper side at least one acceleration channel defined by walls leading spirally from the center to an outer edge, and wherein the inlet channel opens via an approximately central interior region of the acceleration channel.

13. The device of claim 12, wherein the walls defining a spiral-shaped acceleration channel have a shape of multiple arcs and/or a logarithmic curve and/or a curve with a continuous positive incline.

14. The device of claim 13, wherein in the housing of the pellet accelerator, a partially circumferential, groove-like outlet channel is provided about the rotating disk at a level of upper side acceleration channels, wherein a tube-like outlet channel deviates tangentially from the groove-like outlet channel, and wherein the shooting channel is connected to the tube-like outlet channel.

15. The device of claim 1, wherein the pellet deflector on which the accelerated pellets impact with high speed is structured on its surface in such a manner that the breaking-down of the impacting urea pellets into the most and smallest particles possible is achieved.

16. The device of claim 1, wherein the speed regulation of the conveyor belt in the pellet dispensing device and of the rotating disk of the pellet accelerator are coordinated exactly to one another in the sense of an optimal amount/number of urea pellets supplied into the ammonia reactor, wherein both speeds are provided by the electronic, computer-supported control and regulating device, wherein only the speed of the motor of the pellet dispensing device varies, and wherein the speed of the motor of the pellet accelerator remains constantly high at approximately 16,000 rpm.

17. A method for producing ammonia from solid urea pellets stored in a reservoir, having the following steps:
  removing the pellets by means of a pellet dispensing device from the reservoir in a regulated number/quantity;
  transporting the pellets to a pellet accelerator, wherein the pellets are accelerated mechanically to a high speed by the pellet accelerator;
  shooting the pellets from the pellet accelerator into a shooting channel having a shooting path and then into an ammonia reactor;
  breaking down the pellets into a plurality of small pieces by impacting the pellets against a pellet deflector disposed at an end of the shooting path;
  converting the plurality of small pieces immediately thereafter into a gas mixture containing ammonia and isocyanic acid via a urea evaporation device;
  supplying the gas mixture and water vapor into a hydrolytic catalytic converter; and converting the isocyanic acid into ammonia and carbon dioxide with the hydrolytic catalytic converter.

18. The method of claim 17, wherein the gas mixture containing ammonia provided from the hydrolytic catalytic converter is supplied to a further apparatus or device associated with the ammonia reactor for further processing.

* * * * *